«12» United States Patent
Resch et al.

(10) Patent No.: US 10,142,115 B2
(45) Date of Patent: Nov. 27, 2018

(54) DISTRIBUTED STORAGE NETWORK DATA REVISION CONTROL

(75) Inventors: Jason K. Resch, Chicago, IL (US); Greg Dhuse, Chicago, IL (US); Ilya Volvovski, Chicago, IL (US); Andrew Baptist, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 664 days.

(21) Appl. No.: 12/837,961

(22) Filed: Jul. 16, 2010

(65) Prior Publication Data

US 2011/0107113 A1 May 5, 2011
US 2013/0305060 A9 Nov. 14, 2013

Related U.S. Application Data

(63) Continuation-in-part of application No. 12/080,042, filed on Mar. 31, 2008, now Pat. No. 8,880,799.
(Continued)

(51) Int. Cl.
*H04L 12/00* (2006.01)
*G06F 11/14* (2006.01)
(Continued)

(52) U.S. Cl.
CPC .......... *H04L 12/00* (2013.01); *G06F 11/1469* (2013.01); *H04L 9/3247* (2013.01);
(Continued)

(58) Field of Classification Search
CPC ........................................ G06F 21/10
See application file for complete search history.

(56) References Cited

U.S. PATENT DOCUMENTS 4,092,732 A 5/1978 Ouchi
5,454,101 A 9/1995 Mackay et al.
(Continued)

FOREIGN PATENT DOCUMENTS

EP 1191442 A2 3/2002

OTHER PUBLICATIONS

Shamir; How to Share a Secret; Communications of the ACM; vol. 22, No. 11; Nov. 1979; pp. 612-613.
(Continued)

*Primary Examiner* — Yin Chen Shaw
*Assistant Examiner* — Carlos E Amorin
(74) *Attorney, Agent, or Firm* — Garlick & Markison; Timothy W. Markison; Bruce E. Stuckman

(57) ABSTRACT

Multiple revisions of an encoded data slice are generated, with each revision having the same slice name. Each of the data slices represents the same original data portion, but each is encoded so that no single data slice can be used to reconstruct the original data portion. Appropriate revision numbers are associated with each encoded data slice, and the encoded data slices and associated revision numbers are transmitted for storage in selected storage units of a distributed storage network. If write confirmations are received from at least a write threshold number of storage units, a commit command is transmitted so that the most recently written data slices will be available for access. After a commit command is issued, a current directory used to access the encoded data slices can be sliced, encoded, and stored in the same way as the data slices.

14 Claims, 8 Drawing Sheets

Related U.S. Application Data

(60) Provisional application No. 61/256,226, filed on Oct. 29, 2009.

(51) Int. Cl.
*H04L 29/08* (2006.01)
*H04L 9/32* (2006.01)
*G06F 11/10* (2006.01)

(52) U.S. Cl.
CPC ...... *H04L 67/1097* (2013.01); *G06F 11/1076* (2013.01); *G06F 2211/1028* (2013.01)

(56) References Cited

U.S. PATENT DOCUMENTS

| | | | |
|---|---|---|---|
| 5,485,474 A | 1/1996 | Rabin | |
| 5,581,690 A | 12/1996 | Ellis et al. | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 5/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,278,067 B1 | 10/2007 | Coatney et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1* | 4/2007 | Gladwin et al. | 711/154 |
| 2007/0079083 A1 | 4/2007 | Gladwin et al. | |
| 2007/0088970 A1 | 4/2007 | Buxton et al. | |
| 2007/0283167 A1 | 6/2007 | Venters, III et al. | |
| 2007/0174192 A1 | 7/2007 | Gladwin et al. | |
| 2007/0214255 A1 | 9/2007 | Spitz et al. | |
| 2007/0214285 A1 | 9/2007 | Au et al. | |
| 2007/0234110 A1 | 10/2007 | Soran et al. | |
| 2008/0071816 A1* | 3/2008 | Gray | 707/101 |
| 2008/0183975 A1* | 7/2008 | Foster et al. | 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(56) References Cited

OTHER PUBLICATIONS

European Patent Office; Extended European Search Report; EP Application No. 09727284.3; dated Oct. 29, 2015; 8 pgs.

* cited by examiner

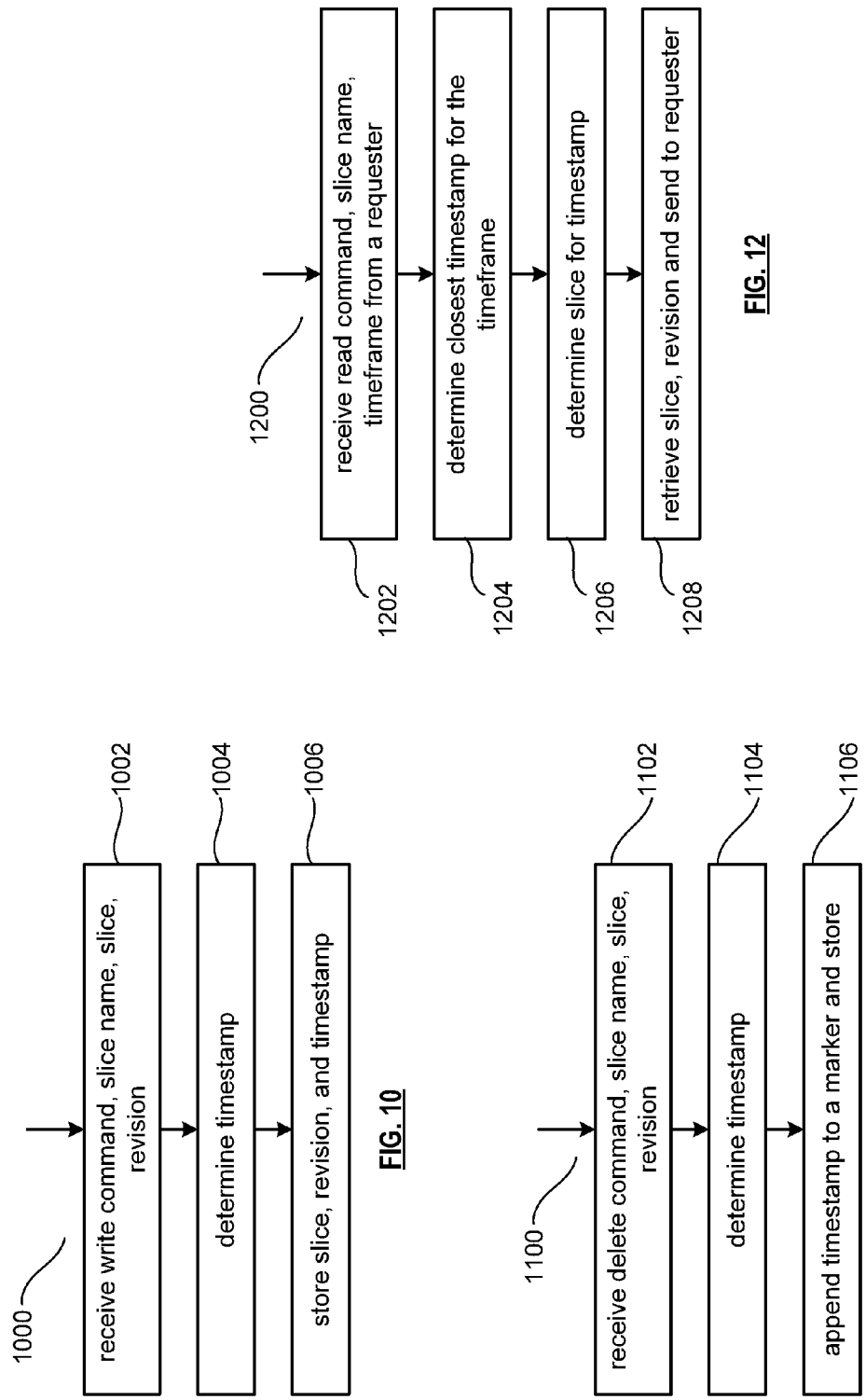

DISTRIBUTED STORAGE NETWORK DATA REVISION CONTROL

CROSS REFERENCE TO RELATED PATENTS

The present U.S. Utility Patent Application claims priority pursuant to 35 U.S.C. § 119(e) to U.S. Provisional Application Ser. No. 61/256,226, entitled "DISTRIBUTED STORAGE NETWORK DATA REVISION CONTROL," filed Oct. 29, 2009, which is hereby incorporated herein by reference in its entirety and made part of the present U.S. Utility Patent Application for all purposes; and is further claiming priority under 35 USC § 120 as a continuation-in-part patent application of patent application entitled REBUILDING DATA ON A DISPERSED STORAGE NETWORK, having a filing date of Mar. 31, 2008, now U.S. Pat. No. 8,880,799 and a serial number of Ser. No. 12/080,042.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a utilize higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWINGS

FIG. 10 is another flowchart illustrating the storing of data;

FIG. 11 is a flowchart illustrating the deleting of data; and

FIG. 12 is a flowchart illustrating the retrieving of data

DETAILED DESCRIPTION OF THE INVENTION

Figure 1:
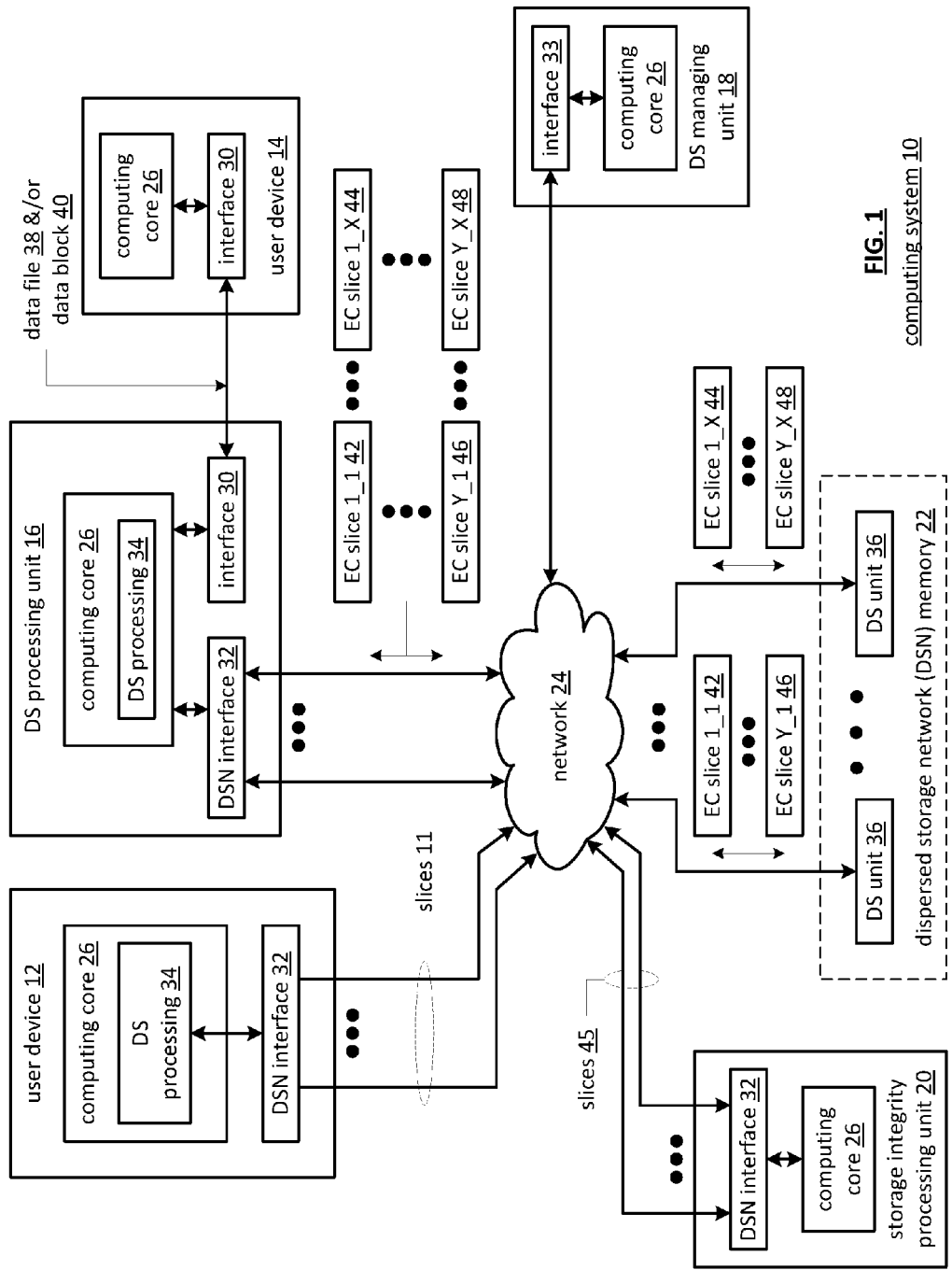
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-12.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-12.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
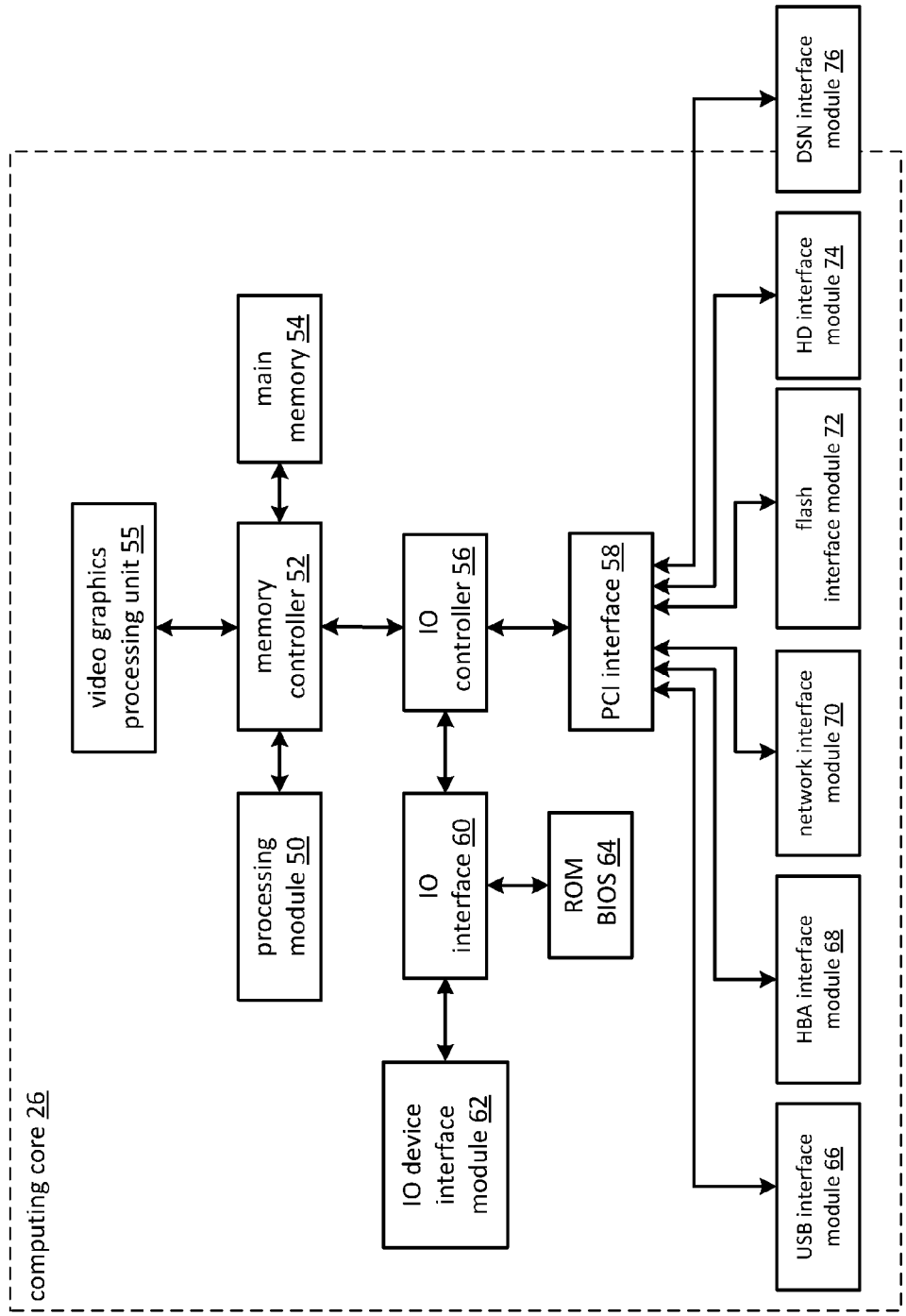
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-12.

Figure 3:
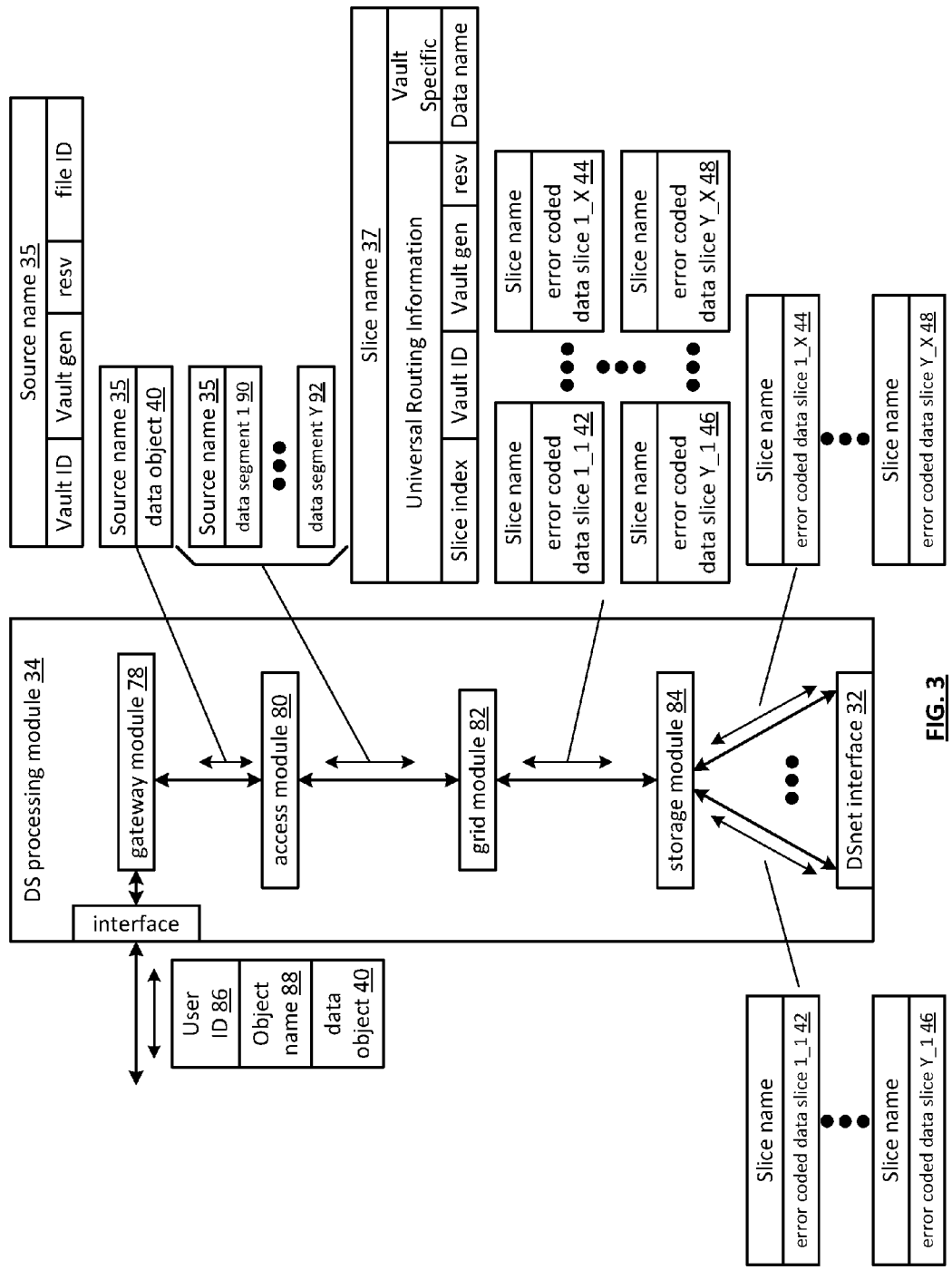
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
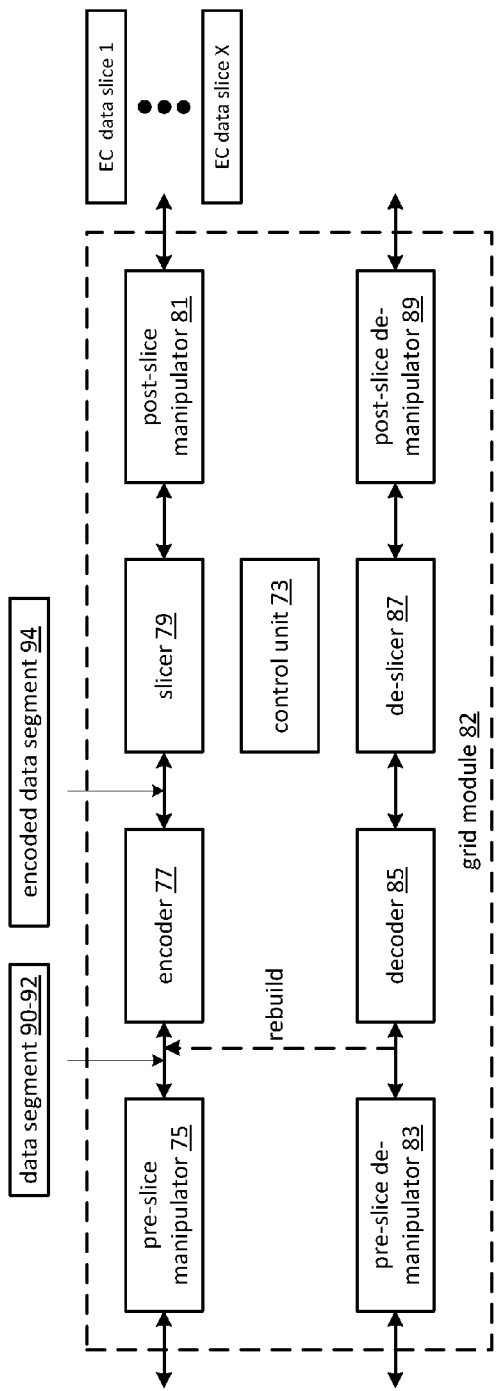
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
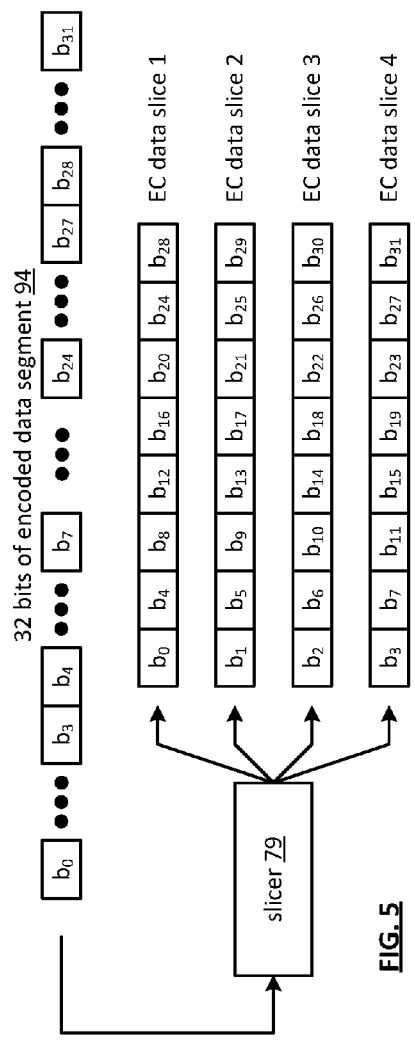
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
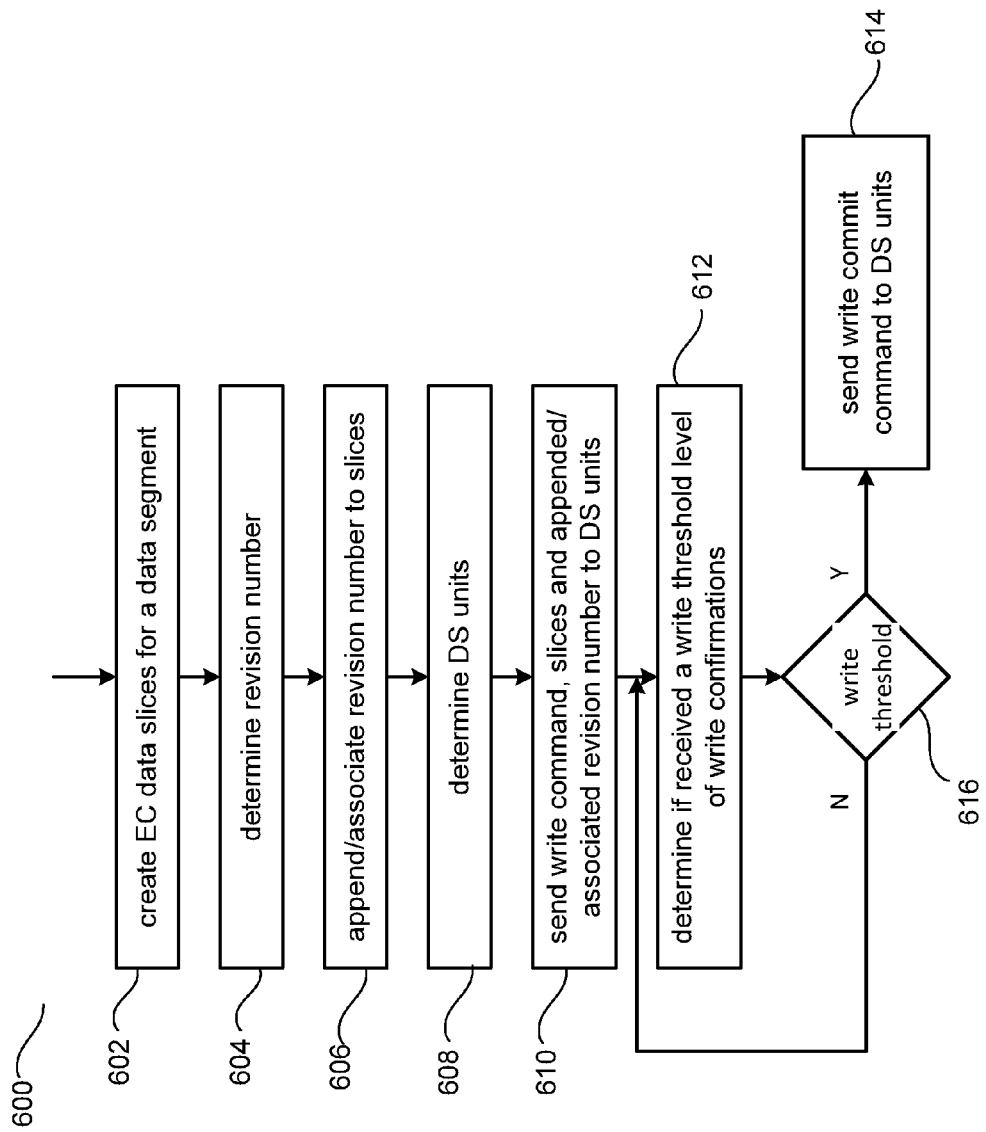
FIG. 6 is a flowchart illustrating the determination of a data revision number.

FIG. 6 is a flowchart illustrating the determination of a data revision number where the DS processing determines the revision number and appends it to, or associates it with EC data slices being distributedly stored. The DS processing subsequent retrieval of EC data slices verifies that the slices utilized to recreate the data segment have the same appended revision number to improve data consistency and system performance. The retrieval method will be discussed in greater detail with reference to FIG. 7.

The method 600 begins with the step 602 where the DS processing creates EC data slices for a data segment in accordance with the operational parameters as previously discussed. As illustrated by block 604, the DS processing determines the revision number for the slices of the data segment based on one or more of a timestamp, a random number, the user vault ID, the user ID, the data object ID, a hash of the data object, and/or a hash of the data object ID. For example, the revision number may be eight bytes and comprise a UNIX time timestamp and a random number (e.g., to provide an improvement of a unique revision number when data is stored at the same time).

As illustrated by block 606, the DS processing appends the revision number to each pillar slice of the same data segment such that each pillar slice of the same data segment has the same revision number. In an embodiment, the DS processing appends the same revision number to all the slices of all the data segments of the data object. In another embodiment, the DS processing appends the same revision number to all the slices of each data segment but the revision numbers from data segment to data segment of the data object are different.

As illustrated by block 608, the DS processing determines the DS units to send the slices to in accordance with the virtual DSN address to physical location table for the user vault of the data object.

As illustrated by block 610, the DS processing sends a write command and slices with the appended revision number to the DS units such that the DS units will store the slices and send a write confirmation message to the DS processing in response. Note that the slices are substantially sent in parallel from the DS processing to the DS units via similar or different portions of the network. Networks are known to fail from time to time thus all of the DS units may not receive the slices. As a result of network failures and other potential issues, the DS units may contain slices with different revision numbers for the same data object and/or data segment.

The DS processing receives the write confirmation message from the DS units. The DS processing determines a write threshold (e.g., from the user vault, a command, a predetermination) where the write threshold is the minimum number of pillars required to store the unique slices of the same data segment to meet the criteria of a favorable write sequence. The write threshold is less than the pillar width n and greater than the read threshold (discussed previously).

As illustrated by blocks 612 and 616, the DS processing determines if the number of received write confirmation messages is equal to or greater than the write threshold. The determination may be based on one or more of comparing the number of received write confirmations to the write threshold, a command, a predetermined, and/or a system performance indicator. The DS processing may continue to keep checking for new write confirmations when the DS processing determines that the number of received write confirmation messages is not equal to or greater than the write threshold. As further illustrated by block 616, the DS processing may fail the write sequence if a predetermined period of time expires before the DS processing determines that the number of received write confirmation messages is equal to or greater than the write threshold.

As illustrated by blocks 614, the DS processing sends a write commit command to the DS units when the DS processing determines that the number of received write confirmation messages is equal to or greater than the write threshold. The DS unit makes the slice visible on subsequent retrievals when the DS unit receives the write commit command for slices the DS unit has write confirmed.

The DS unit may request the slice be resent from the DS processing when the DS unit receives the write commit command for slices the DS unit has not write confirmed. The DS processing sends the write command and slices with the appended revision number to the DS units such that the DS units will store the slices and send a write confirmation message to the DS processing in response when the DS processing receives the slice request from the DS unit.

Figure 7:
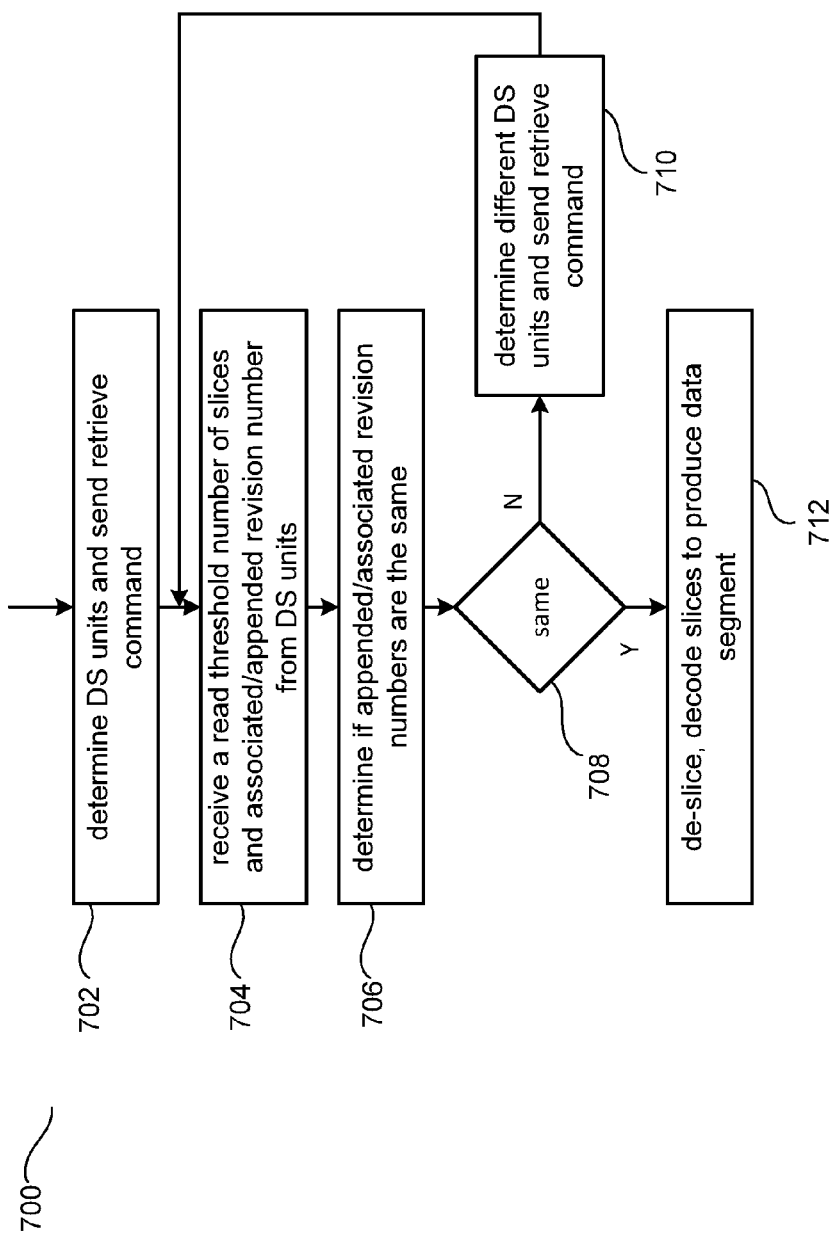
FIG. 7 is a flowchart illustrating the retrieving of like revision data.

FIG. 7 is a flowchart illustrating the retrieving of like revision data where the DS processing retrieves slices from the DS unit pillars and verifies that the slices have the same appended revision numbers to improve data consistency.

According to method 700, at block 702 the DS processing determines the DS units (the pillars) to retrieve slices from in accordance with the virtual DSN address to physical location table for the user vault of the data object. As further illustrated by block 702, the DS processing sends a retrieve command message to the DS units where the message includes the slice name. The DS processing sends the retrieve command to at least a read threshold number of DS units. For example, the DS processing sends the retrieve command to ten DS units in a 16/10 DSN system. In another example, the DS processing sends the retrieve command to twelve DS units in a 16/10 DSN system to provide better performance. The DS processing may create and temporarily save a list of DS units that were sent the retrieve command such that the DS processing may choose different DS units in a subsequent retrieval attempt if the present retrieval attempt fails. DS units send the slice and appended revision number corresponding the slice name to the DS processing when the DS unit receives the retrieval command message.

As illustrated by block 704, the DS processing receives the slices and appended revision number from the DS units. The DS processing determines the number of received slices by counting them. The DS processing determines the read threshold number for this vault by retrieving the read threshold number form the vault. The DS processing proceeds to the next step when the DS processing determines that at least a read threshold number of slices have been received from the DS units.

As illustrated by blocks 706 and 708, the DS processing determines if the appended revision numbers for the slices from each of the DS units are the same by comparing the revision numbers. Note that it is possible for some of the revision numbers to be different (e.g., as a result of a failure of a previous write sequence or some other DS unit failure).

As illustrated by block 710, the DS processing determines different DS units to send retrieval commands and the DS processing sends the retrieve command to at least a read threshold number of DS units when the appended revision numbers for the slices from each of the current DS units are not the same. The determination may be based on which DS units were already tried (saved previously) and which of those were in a majority where the majority had the same revision number. In such a scenario, the DS processing need only send a retrieval command message to a smaller set of DS units that have not been tried yet. The method branches to the step of the DS processing receiving a read threshold number of slices with appended revision numbers from the DS units.

As illustrated by block 712, the DS processing de-slices and decodes the slices to produce the data segment when the appended revision numbers for the slices from each of the current DS units are the same.

Figures 8, 9:
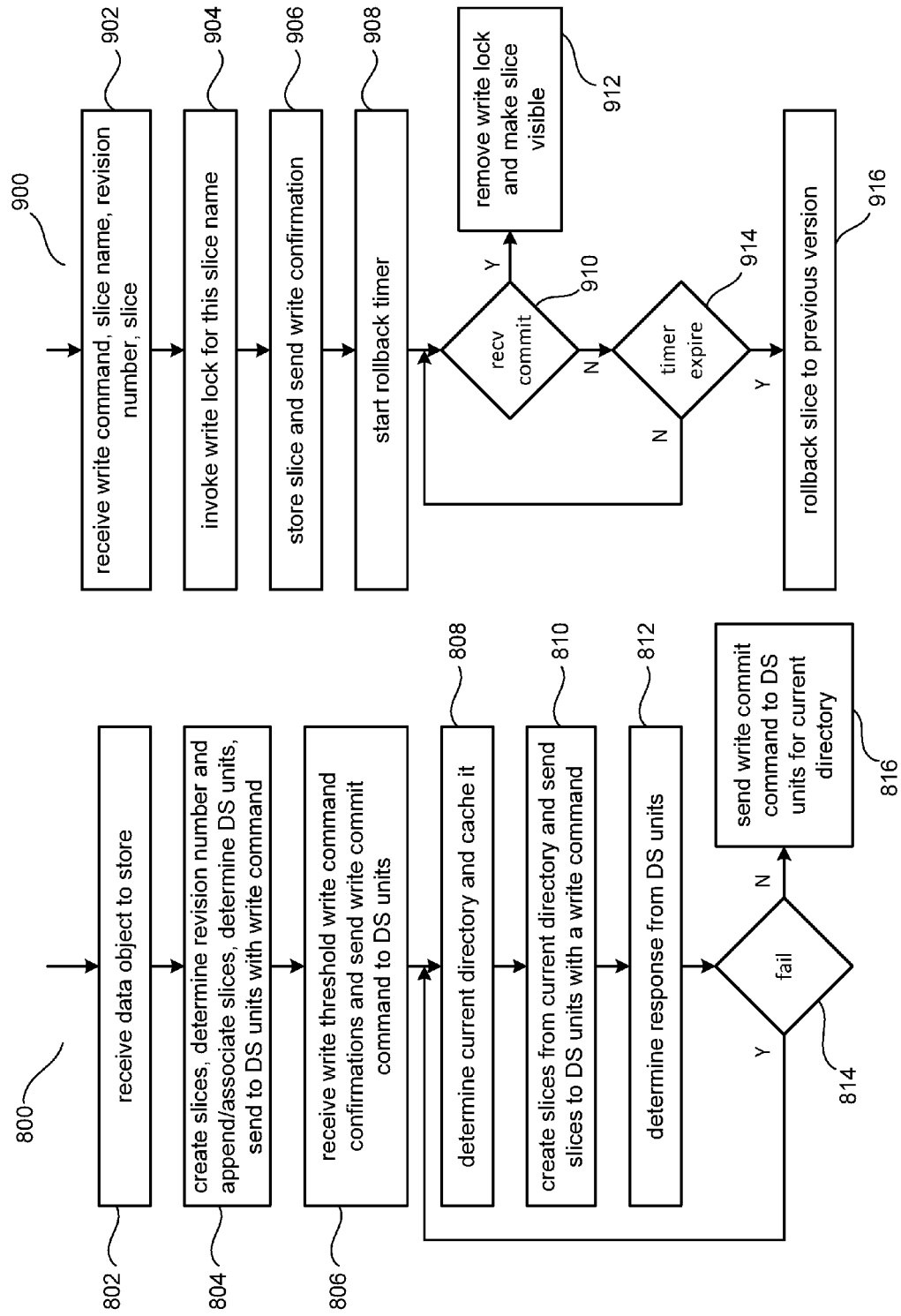
FIG. 8 is a flowchart illustrating the storing of data.
FIG. 9 is another flowchart illustrating the storing of data.

FIG. 8 is a flowchart illustrating the storing of data where the DS processing utilizes a transaction process to improve data consistency.

The method 800 begins at block 802, where the DS processing receives a data object to store (e.g., from the user device). As illustrated by block 804, the DS processing creates the slices in accordance with the operational parameters and appends revision numbers created as previously discussed with reference to FIG. 6. The DS processing determines the DS units and sends a write command and the slices with the appended revision numbers. The determination may be based on the virtual DSN address to physical location table.

As further illustrated by block 804, the DS unit sends a write command confirmation message to the DS processing in response to receiving the write command. The DS processing receives the write command confirmation messages, counts them, and determines if a write threshold number of confirmations has been received by comparing the count of received write command confirmation messages to the write threshold. The DS processing sends a write commit command to the DS units where the DS processing received a write command confirmation message. Note that now the newest revision is successfully stored in the DSN.

In the next steps, the DS processing stores the directory in the DSN memory where the directory links the user root file to the data object to the slice name and revisions. In other words, the directory maps the data object to locations of encoded data slices generated from the data objects. These locations may be virtual DSN addresses, such as a source name or slice name that is further translated, e.g., via a lookup in a virtual DSN address to physical location table, to the DS unit locations, e.g., DS unit identifier.

As illustrated by block 808, the DS processing determines the current directory (e.g., reading it in the DS processing file system, receiving it from the user device, etc.) and caches it locally in the DS processing. As shown at block 810, the DS processing creates slices for the current directory and sends the slices with the write command and a revision number (e.g., the directory is assigned a revision number) to the DS units associated with the user vault. After caching the current directory, and before sending the directory slices to be stored, a new entry can be added to represent the directory slices. The DS units receive the slices and write command and will process the write sequence as will be discussed in greater with reference to FIG. 9.

As illustrated by blocks 812 and 814, the DS processing determines the response from the DS units where the response may be a write failure or a write success (e.g., a write command confirmation). The write failure may result from one or more of the slice names were already write locked (e.g., an active write transaction was already in process), the DS processing determines that the number of write confirmations is below the write threshold, and/or the number of write confirmations with the same revision numbers is below the write threshold.

As illustrated by block 814, the DS processing branches back to the step of determining the directory when the DS processing determines the response from the DS units is a write failure.

As illustrated by block 816, the DS processing sends a write commit command to the DS units where the DS processing received successful write confirmations when the DS processing determines the response from the DS units is a write success. Note that this step will activate the revision of the current directory.

FIG. 9 is another flowchart illustrating the storing of data where the DS unit processes write transactions in accordance with a transaction process to improve the consistency of stored data.

The method 900 begins at block 902, where the DS unit receives a write command, slice name, revision number, and slice for storage. The DS unit may determine if this slice name is already in a write locked state (e.g., in an active write sequence) by a lookup. The DS unit may send a write lock failure message to the DS processing when the DS unit determines that this slice name is already in a write locked state.

As illustrated by block 904, the DS unit may invoke write lock (e.g., write in a local table for this slice name) for this slice name when the DS unit determines that this slice name is not already in a write locked state.

As illustrated by block 906, the DS unit stores the slice and revision and sends a write confirmation command message to the DS processing where the message includes the write confirmation, the slice name, and the revision.

As illustrated by block 908, the DS unit starts a rollback timer where the time value may be determined by the DS unit based on a predetermined value (e.g., a lookup) or a variable value based in part on a system performance indicator. For example, a longer rollback timer may be determined when the system performance indicator indicates that the system is busier than the average.

As illustrated by block 910, the DS unit determines if the write commit command has been received from the DS processing when the rollback timer is active. As illustrated by block 912, the DS unit removes the write lock and makes the slice visible in subsequent retrievals when the DS unit determines that a receive commit was received while the rollback timer is active.

As illustrated by block 914, the DS unit determines if the rollback timer has expired when the DS unit determines that a receive commit has not been received while the rollback timer is active. The DS unit branches back to the step of determining if a write commit command has been received when the DS unit determines that the rollback timer has not expired.

As illustrated by block 916, the DS unit rolls back the version to the previous slice version (e.g., subsequent retrievals will provide the last version, not the current version), removes the write lock for this slice name, and may delete the current version when the DS unit determines that the rollback timer has expired.

Generally, after a write the DS unit may either commit or rollback. A rollback may be implemented in response to a rollback request, or in response to a failure to receive a commit command. Both a commit and a rollback result in the write lock for the slice being removed. In other embodiments, the same behavior as receiving a rollback request, can be implemented using an inactivity timer. In various embodiments, rolling back a request does not necessarily restore a slice to its previous version, because in general the state of the latest slice is changed using a commit procedure. Instead any temporary memory used for holding an uncommitted slice is freed. Also, when a slice is committed, any previous revisions for that slice continue to exist.

FIG. 10 is another flowchart illustrating the storing of data where the DS unit stores a revision.

The method 1000 begins at block 1002, with the DS unit receiving a write command, slice name, slice, and revision from the DS processing. As illustrated by block 1004, the DS unit determines a local timestamp where in an embodiment the timestamp may be a UNIX time timestamp.

As illustrated by block 1006, the DS unit stores the slice, revision, and timestamp. Note that the DS unit may not delete previous revisions of slices of the same data object such that the data object may be subsequently retrieved from previous revisions based in part on the timestamp.

FIG. 11 is a flowchart illustrating the deleting of data where the DS unit processes a delete sequence for a revision.

The method 1100 begins at block 1102 with the DS unit receiving a delete command, slice name, and revision from the DS processing. In various embodiments, delete commands may not be used; instead a write command is used to cause the DS unit to "write" a delete marker. As illustrated at block 1104, the DS unit determines a local timestamp where in an embodiment the timestamp may be a UNIX time timestamp.

As illustrated as block 1106, the DS unit appends the timestamp and a delete marker to the slice. Note that the DS unit may not delete the slice in favor of marking when the delete command was received. In another embodiment, the DS unit deletes selective slices to free up memory while preserving at least a read threshold number of slices per data such that the data object may be subsequently retrieved from previous revisions based in part on the timestamp.

FIG. 12 is a flowchart illustrating the retrieving of data where the DS unit retrieves a particular revision of a data segment (e.g., of a data object) based in part on the timestamp. In other words, the DS unit will retrieve sluices of a snapshot of the data object.

The method 1200 begins at block 1202 with the DS unit receiving a read command, slice name, and timeframe from a requester (e.g., the DS processing unit, the DS managing unit, the storage integrity processing unit, or the user device). Note that the timeframe may or may not be exactly aligned with timestamps associated with previous revisions. As illustrated by block 1204, the DS unit determines which local timestamp is closest to the timeframe based on a comparison of timestamps to the timeframe.

As illustrated by block 1206, the DS unit determines the slice for the timestamp based on a lookup. Note that this slice revision represents the snapshot closest to the received timeframe. As illustrated at block 1208, the DS unit retrieves the slice and revision and sends the slice and revision to the requester.

In some embodiments, a read request returns all available revisions, rather than a specific version or versions associated with a specific time frame. When all revisions are returned in response to a read request, the DS processing unit can determine the best way to handle the various revisions received.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a computing device that includes a computing core, the method comprising:
   encoding a first data segment using an error coding dispersal storage function to produce a first set of encoded data slices;
   determining a first revision number regarding a version of the first data segment;
   associating the first revision number to each encoded data slice of the first set of encoded data slices to produce a first set of appended encoded data slices;
   transmitting, by the computing device via an output interface, write commands regarding the first set of appended encoded data slices to storage units of a distributed storage network (DSN), wherein the write commands include the first set of appended encoded data slices for storage in the storage units;
   receiving write confirmation messages from at least some of the storage units;
   verifying the first revision number within the write confirmation messages;
   when a write threshold number of write confirmation messages have been received and the first revision number has been verified within each of the write threshold number of write confirmation messages, sending write commit messages to the storage units; and
   slicing, encoding and storing a current directory used to access the encoded data slices in the same way as the first data segment.

2. The method of claim 1, wherein the first revision number is appended to each encoded data slice of the first set of encoded data slices.

3. The method of claim 1 further comprising:
   determining whether write commit responses have been received from at least some of the storage units, wherein a write commit response indicates that a storage unit has made a corresponding encoded data slice visible.

4. The method of claim 1 further comprising:
   when the write confirmations for the at least the write threshold number of each of the first set of appended encoded data slices have not been received, retransmitting at least some of the write commands to different storage units.

5. The method of claim 1, further comprising:
   determining the first revision numbers based on at least one of a timestamp, a random number, a user vault identifier, a user identifier, a data object identifier, a hash of the first data segment, and a hash of a data segment identifier.

6. A method for execution by a computing device that includes a computing core, the method comprising:
   retrieving, via an input interface of the computing device, a first set of appended encoded data slices from storage units of a distributed storage network (DSN);
   processing, by the computing device, the first set of appended encoded data slices to produce a set of first revision numbers and a first set of encoded data slices;
   comparing the set of first revisions numbers; and
   when each of the first revision numbers of the set of first revision numbers has the same value and the first set of appended encoded data slices includes a read threshold number of appended encoded data slices, decoding, by the computing device, the first set of encoded data slices using an error coding dispersal storage function to reconstruct a first data segment.

7. The method of claim 6, further comprising:
when each of the first revision numbers of the set of first revision numbers does not include the same number, retrieving an encoded data slice of a plurality of encoded data slices from another storage unit, wherein the first data segment was encoded into the plurality of encoded data slices and a threshold number of encoded data slices is required to reproduce the first data segment.

8. The method of claim 6, further comprising:
the first set of encoded data slices including a threshold number of encoded data slices of a plurality of encoded data slices, wherein the first data segment was encoded into the plurality of encoded data slices, wherein the threshold number of encoded data slices is required to reproduce the first data segment.

9. A distributed storage computing device comprising:
an interface;
memory; and
a processing system, including a processor and operably coupled to the interface and to the memory, wherein the processing system is operable to:
 encode a first data segment using an error coding dispersal storage function to produce a first set of encoded data slices;
 determine a first revision number regarding a version of the first data segment;
 associate the first revision number to each encoded data slice[H] of the first set of encoded data slices to produce a first set of appended encoded data slices;
 transmit, via the interface, write commands regarding the first set of appended encoded data slices to storage units of a distributed storage network (DSN);
 receive write confirmation messages from at least some of the storage units;
 verify the first revision number within the write confirmation messages;
 when a write threshold number of write confirmation messages have been received and the first revision number has been verified within each of the write threshold number of write confirmation messages, send write commit messages to the storage units; and
 slice, encode and store a current directory used to access the encoded data slices in the same way as the first data segment.

10. The distributed storage computing device of claim 9, wherein the first revision number is appended to each encoded data slice of the first set of encoded data slices.

11. The distributed storage computing device of claim 9, wherein the processing system is further operable to:
 determine whether write commit responses have been received from at least some of the storage units, wherein a write commit response indicates that a storage unit has made a corresponding encoded data slice visible.

12. A distributed storage computing device comprising:
an interface;
memory; and
a processing system that includes a processor and is operably coupled to the interface and to the memory, wherein the processing system is operable to:
 retrieve a first set of appended encoded data slices from storage units of a distributed storage network (DSN);
 process the first set of appended encoded data slices to produce a set of first revision numbers and a first set of encoded data slices;
 compare the set of first revision numbers; and
 when each of the first revision numbers of the set of first revision numbers has the same value and the first set of appended encoded data slices includes a read threshold number of appended encoded data slices, decode the first set of encoded data slices using an error coding dispersal storage function to reconstruct a first data segment.

13. The distributed storage computing device of claim 12, wherein the processing system is further operable to:
 when each of the first revision numbers of the set of first revision numbers does not include the same number, retrieve an encoded data slice of a plurality of encoded data slices from another storage unit, wherein the first data segment was encoded into the plurality of encoded data slices and a threshold number of encoded data slices is required to reproduce the first data segment.

14. The distributed storage computing device of claim 12 further comprising:
the first set of encoded data slices including a threshold number of encoded data slices of a plurality of encoded data slices, wherein the first data segment was encoded into the plurality of encoded data slices, wherein the threshold number of encoded data slices is required to reproduce the first data segment.

* * * * *